Oct. 21, 1958 L. P. ENTIN 2,856,779
GYROSCOPE APPARATUS
Filed Nov. 7, 1956
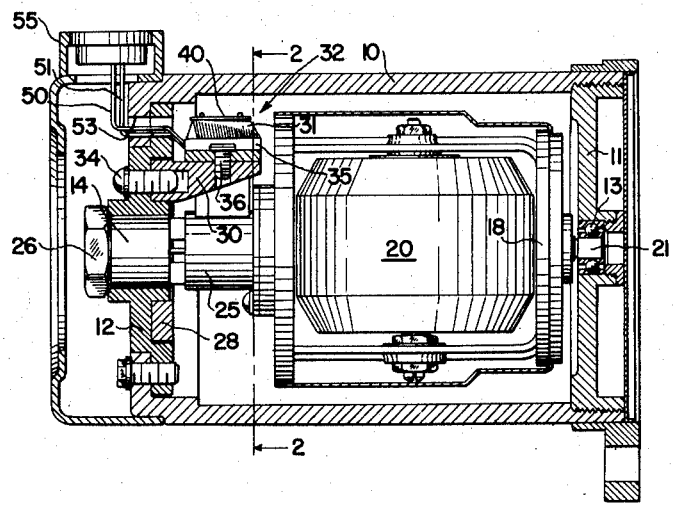
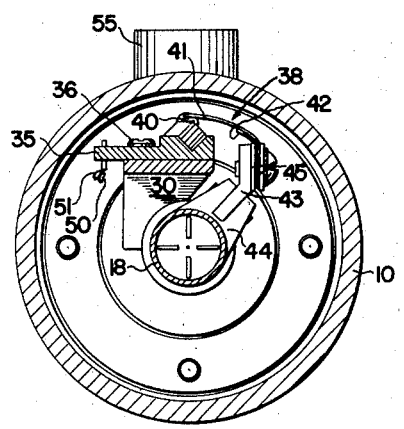
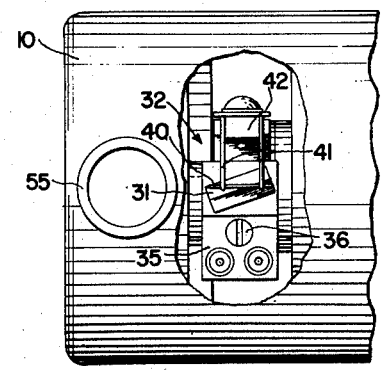
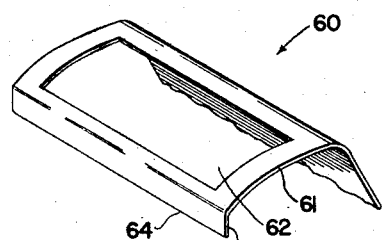
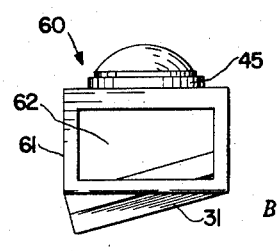
INVENTOR.
LEONARD P. ENTIN
BY Joseph E. Ryan
ATTORNEY 2,856,779

GYROSCOPE APPARATUS

Leonard P. Entin, Wayland, Mass., assignor to Minneapolis-Honeywell Regulator Company, Minneapolis, Minn., a corporation of Delaware Application November 7, 1956, Serial No. 620,876

10 Claims. (Cl. 74—5.6)

My invention relates to an improved gyroscope apparatus and more particularly to an improved limited displacement gyroscope incorporating a simplified high resolution signaling generator.

Limited displacement gyroscopes, particularly rate type gyroscopes and certain other types of free gyroscopes, that are without erection systems, for aircraft and missile applications generally have very small angular limited displacement about the pivoted axis thereof and present a problem in the incorporation of a signaling device therewith to retain a necessary accuracy for gyroscope output. In order to meet the system requirements in present day control systems, our units of this type have required the inclusion of complex and expensive signal generators generally of the magnetic type to maintain the accuracy and resolution required for operation in such control circuitry.

My improved gyroscopic apparatus is directed to a limited displacement gyroscope which incorporates or includes simplified signal generator components with a particular arrangement or relationship between the components and the gyroscopic parts to provide for high resolution and accuracy in the output of the gyroscope. The particular signal generator utilized herein is the conventional potentiometer, the parts of which are so arranged with respect to the gyroscope to give the high degree of resolution and accuracy for limited displacement of the gyroscope. It is therefore an object of this invention to provide an improved limited displacement gyroscope apparatus. A further object of this invention is to provide an improved gyroscopic apparatus utilizing a potentiometer type signal generating device which provides high resolution and accuracy for limited displacement of the gyroscope. These and other objects of this invention will become apparent from a reading of the attached description together with the drawing wherein:

Figure 1 is a side elevation view in section of an improved gyroscopic apparatus utilizing the invention;

Figure 2 is a sectional view of the improved gyroscopic apparatus shown in Figure 1 taken along the line 2—2 thereof;

Figure 3 is a top view of the section shown in Figure 2;

Figure 4 is a perspective of another embodiment of wiper assembly; and

Figure 5 is a top view of the assembly of the wiper of Figure 4 with the winding signal generating device.

My improved gyroscopic apparatus is shown in the drawings in the form of a single axis rate type gyroscope having limited angular displacement. It should be noted, however, that while we have shown the invention in connection with the rate type gyroscope that other types of limited displacement gyroscopes adapt equally well to the invention. As shown in Figure 1, my improved gyroscopic apparatus includes an outer case or frame 10 forming the base of the gyroscope and having end walls 11 and 12 positioned therein for supporting and closure purposes. Positioned in the end wall 11 is a bearing means 13 and a similar aperture 14 is positioned in the end wall 12 for purposes to be later noted. Contained within the casing or enclosure defined by the end walls of the outer casing is a rotor support or gimbal 18 which mounts or journals a rotor mass indicated generally at 20 pivoted in the rotor support for rotational movement and energized through suitable means not shown. The support 18 includes a trunnion 21 which fits into the bearing means 13 for rotational mounting at this point. Attached to the gimbal frame is a cantilever type spring mechanism 25 which is secured at its free extremity in the aperture 14 of end wall 12 and locked therein through suitable securing means such as nut 26. The spring means as in some rate gyroscopes operates to generally or pivotally mount the rotor mass at this extremity and in the end wall 12 and provides the elastic restraint or bias which pushes the rotor support toward the neutral position. The mounting of the spring in the end wall and the journal in the bearing provide a pivot axis for the rotor support and gyroscopic mass mounted thereon about a pivot axis which has limited displacement. Mounted on the end wall 12 of the enclosing structure is a circular support member 28 having a flange like extension 30 upon which is positioned a winding 31 of a potentiometer 32 forming the signaling device for the gyroscope. As shown in the drawings, the winding which is mounted on a suitable form or bobbin is approximately square or rectangular in cross section and has an appreciable extent. This winding is mounted in a holder 35 such that one edge of the same will be exposed for contact by the wiper assembly as will be later defined. Support 30 is suitably secured to the end wall 12 through screw means 34 and the winding as shown in the drawings is fitted into the winding support or holder 35 which is secured to the flange like extension 30 of the support member by suitable means such as screws 36. The mounting bracket for the winding has a suitable recess surface for positioning the winding therein and this recess surface and the extent of the winding as will be evident from the drawings is angularly offset from the pivot axis of the gyroscope as best seen in Figures 2 and 3. The wiper assembly 38 of the potentiometer 32 includes a wire like wiper element 40 which is attached at its extremities to a pair of flexible mounting arms 41, the arms 41 in turn being secured to a mounting plate 42 which is mounted on and insulated from a bracket 43 attached to a hub member 44 secured to the gimbal or rotor support 18. Suitable insulation means 45 insulates the wiper arms or mounting arms 41 from the supports 44 and 43. The wire like member 40 is flexibly mounted through the arms 41 so that it will allow for lateral movement and predetermined contact pressure as it engages the winding 31 of the potentiometer. As indicated in Figure 2, in leads 50 and 51 connect to the wiper and winding respectively and pass through an aperture in the end wall 53 to a terminal assembly 55 mounted on and integral with the casing of the gyroscope. As indicated in Figure 2, the wire like member is so positioned relative to the pivot axis of the gyroscope that it is parallel thereto and is so mounted on its supporting structure that this parallel relationship is maintained as the gyroscope rotor support 18 moves to its limited range of movement.

As shown in the drawings, the wiper member or element 40 of the wiper assembly 38 contacts the bridge like surface of the winding 31 with the wire like member making contact with the winding at varying points along the extent of the winding and wiper respectively. The axis of the wire like member 40 or the longitudinal extent of the same is offset from the longitudinal extent of the bobbin by some angle. By slightly skewing or offsetting the angle of the wiper, it will be apparent that the wiper member will be moved across the entire extent of the winding although only a small angular displacement or movement of the wiper assembly is required for this extent of travel. This will provide for high resolution and extreme accuracy in a potentiometer device which incorporates simplified components for a signal generator.

In Figures 4 and 5 there is shown a second embodiment of the wiper assembly identified in the figure generally at 60. The second embodiment includes a blade member 61 whose width is substantially the same as the length of the bobbin and winding 31 of the potentiometer assembly. The blade member 61 is bent transversely to provide a transverse section 61 having an aperture 62 therein such that this transverse portion forms flexible arms or spring sections. Blade member 61 also includes a second transverse bend to provide a projecting portion 63 forming the contact or engaging section of the blade assembly having an engaging surface 64 which, although not shown in the drawings, is rounded to provide a substantially knife edge type engagement with the winding surface 31. The blade member 61 is adapted to be mounted on the mounting plate 42 and bracket 43 through insulating means 45 and secured to the bracket 43 by screw means as shown in Figure 5. Thus this blade member 61 will be insulated from its supporting structure and will have suitable electrical connection means, not shown, providing a circuit connection through the blade to the winding 31 to be associated therewith. As in the preferred embodiment, the contact engaging portion 64 of the wiper assembly 60 is adapted to be positioned relative to the winding 31 such that it will be slightly skewed therefrom as indicated in Figure 5.

It will also be recognized that the angular relationship between the winding and wiper and the length of these elements are such that they contact one another substantially over their extent during the allowable displacement of the gyroscope upon its displacement axes. It will be recognized that an interchange may be made in relationship of the parts such that the wiper member may be skewed on its mounting assembly, and the winding may be aligned with the pivot axis of the gyroscope and the same operation will be obtained. Further the parts may be interchanged such that the movable element may be the winding and the wiper may be stationary. This arrangement of parts provides for extreme simplicity in a low displacement gyroscope which normally has required extremely complex signal generators to obtain the desired accuracy and resolution over the limited range of displacement. With the present arrangement simplified potentiometer components may be utilized in a connection with a limited displacement gyroscope to obtain the same output results. In considering this invention it should be kept in mind that the present disclosure is intended to be illustrative only and I wish to be limited in my invention only by the appended claims.

I claim:

1. In combination; a gyroscope having a rotating mass and a rotor support journaling the same, a base member, means mounting said rotor support on the base member to define a pivot axis for said gyroscope and with a limited displacement about said pivot axis, a potentiometer including a potentiometer winding mounted on an elongated bobbin and attached to said base, said bobbin being attached to said base such that the extent of said bobbin makes an acute angle with the pivot axis of said gyroscope, and an elongated wiper means for said potentiometer substantially the same length as the extent of said bobbin mounted on said rotor support and parallel to the pivot axis of said gyroscope and engaging said winding.

2. In combination; a gyroscope having a rotating mass and a rotor support journaling the same, a base member, means mounting said rotor support on the base to define a pivot axis for said gyroscope and with a limited displacement about said pivot axis, a potentiometer including a potentiometer winding mounted on an elongated bobbin and attached to said base, said bobbin being attached to said base such that the extent of said bobbin makes a slight angle with the pivot axis of said gyroscope and an elongated wiper means for said potentiometer substantially the same length as the extent of said bobbin mounted on said rotor support and parallel to the pivot axis of said gyroscope and engaging said winding.

3. In combination; a gyroscope having a rotating mass and a rotor support journaling the same, a base member, means mounting said rotor support on the base to define a pivot axis for said gyroscope and with a limited displacement about said pivot axis, an elongated winding and a wiper member of substantially the same length as the elongated winding, means mounting said winding on the base, means mounting said wiper member on said rotor support for movement therewith and in a direction normal to the extent of said wiper, said winding and said wiper being positioned in a contacting relationship and such that the elongated winding and said wiper member are offset from a parallel relationship by a slight angle.

4. In combination; a gyroscope having a rotating mass and a rotor support journaling the same, a base member, means mounting said rotor support on the base to define a pivot axis for said gyroscope and with a limited displacement about said pivot axis, an elongated winding and a wiper member of substantially the same length as the elongated winding, means mounting said winding on the base, means mounting said wiper member on said rotor support for movement therewith and in a direction normal to the extent of said wiper member, said winding and said wiper member being positioned in a contacting relationship and such that the elongated winding and said wiper member are offset from a parallel relationship by a slight angle such that said winding and said wiper member are in contacting relationship at varying points along the extent of both winding and wiper member over substantially the full range of displacement of said gyroscope.

5. In combination; a gyroscope having a rotating mass and a rotor support journaling the same, a base member, means mounting said rotor support on the base to define a pivot axis for said gyroscope and with a limited displacement about said pivot axis, a signal producing device comprising a pair of relatively movable elongated elements one of which is an energizing winding and the other of which is a wiper member, means mounting one of said elements of said signal producing device on said base member and the other of said elements on said rotor support and so positioned with respect to one another that the longitudinal axes of said elements are at a slight angle when the elements contact one another at varying points along the extent of each element which angle remains constant during the range of relative movement of said elements.

6. In combination; a gyroscope having a rotating mass and a rotor support journaling the same, a base member, means mounting said rotor support on the base to define a pivot axis for said gyroscope and with a limited displacement about said pivot axis, a signal producing device comprising a pair of relatively movable elongated elements one of which is an energizing winding and the other of which is a wiper member, means mounting one of said elements from said signal producing device on said base member and the other of said elements on said rotor support and so positioned with respect to one another that the longitudinal axes of said elements are at an acute angle with respect to one another to contact one another along the extent of each of the elements with the magnitude of the angle and the length of the elements permitting substantially total displacement of the gyroscope over its limited displacement range within the range of contact of said elements.

7. In combination; a gyroscope having a rotating mass and a rotor support journaling the same, a base member, means mounting said rotor support on the base to define a pivot axis for said gyroscope and with a limited displacement about said pivot axis, a signal producing device comprising a pair of relatively movable elongated elements one of which is an energizing winding and the other of which is a wiper member, means mounting one of said elements from said signal producing device on said base member and the other of said elements on said rotor support and so positioned with respect to one another that the longitudinal axes of said elements are at an acute angle with respect to one another with the relative movement of said elements being in a direction substantially normal to the extent of said elements.

8. In combination; a gyroscope having a rotating mass and a rotor support journaling the same, a base member, means mounting said rotor support on the base to define a pivot axis for said gyroscope and with a limited displacement about said pivot axis, a signal producing device comprising a pair of elongated elements which are relatively movable and in contact with one another to produce a variable electrical signal when one of said elements is energized, means mounting one of said elements of said signal producing device on the base member and the other of said elements of said signal producing device on said rotor support, said elements of said signal producing device being at a slight angular relationship to one another to contact one another over substantially the full extent of both elements.

9. In combination; a gyroscope having a rotating mass and a rotor support journaling the same, a base member, means mounting said rotor support on the base to define a pivot axis for said gyroscope and with a limited displacement about said pivot axis, a signal producing device comprising a pair of elongated elements which are relatively movable and in contact with one another along their extent to produce a variable electrical signal when one first of said elements is energized, means mounting one of said elements of said signal producing device on the base member and the other of said elements of said signal producing device on said rotor support, said elements being so positioned as to make a slight angle relative to one another and being positioned relative to said base and said rotor support such that the direction of relative movement is substantially normal to the extent of said elements.

10. In combination; a gyroscope having a rotating mass and a rotor support journaling the same, a base member, means mounting said rotor support on the base to define a pivot axis for said gyroscope and with a limited displacement about said pivot axis, a signal producing device comprising a pair of elongated elements one of which is an energizing winding and the other of which is the wiper member having an elongated wiping surface, means mounting one of said elements of said signal producing device on said base member and the other of said elements on said rotor support, said elements being so mounted that the extent of one element is substantially parallel to the pivot axis of the gyroscope and the extent of the other of said elements is slightly offset from said gyroscope pivot axis.

References Cited in the file of this patent

UNITED STATES PATENTS

| | | |
|---|---|---|
| 2,389,158 | Lane et al. | Nov. 20, 1945 |
| 2,428,345 | Turner | Sept. 30, 1947 |
| 2,635,469 | Summers | Apr. 21, 1953 |